Figure 1:
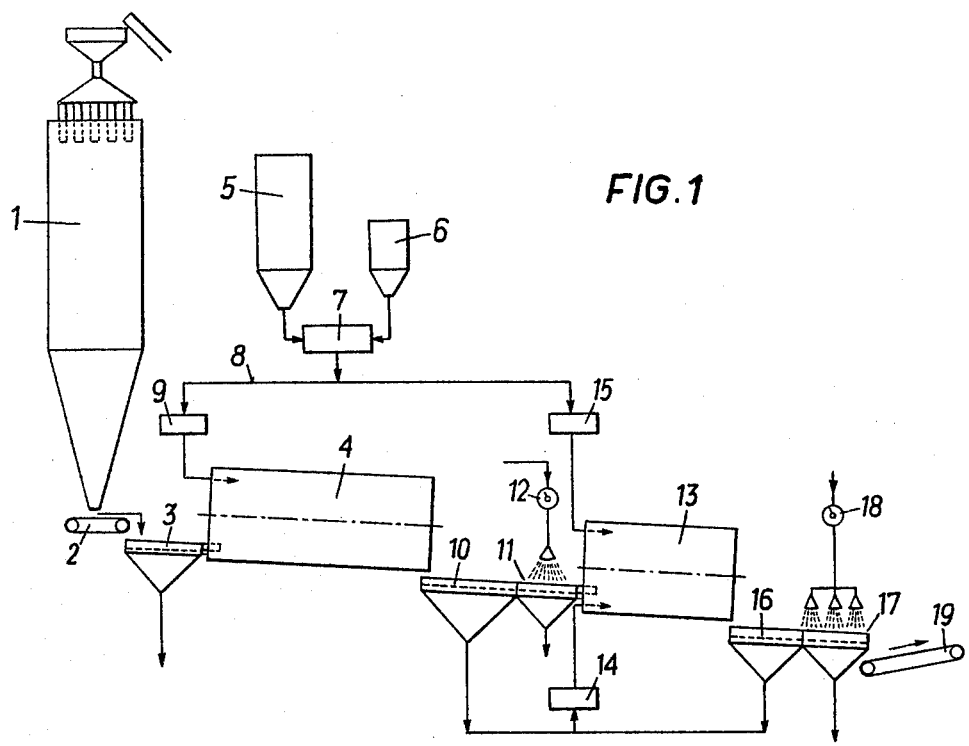

United States Patent [19]

Sulzbacher et al.

[11] 4,254,167
[45] Mar. 3, 1981

[54] PROCESS OF TREATING SPONGE IRON FOR PROTECTION AGAINST REOXIDATION AND APPARATUS FOR CARRYING OUT THE PROCESS

[75] Inventors: Horst Sulzbacher; Kurt Stift, both of Leoben; Günther Saiger, Trofaiach, all of Austria

[73] Assignee: Vereinigte Osterreichische Eisen- und Stahlwerke-Alpine Montan Aktiengesellshaft, Vienna, Austria

[21] Appl. No.: 924,565

[22] Filed: Jul. 14, 1978

[30] Foreign Application Priority Data

Aug. 25, 1977 [AT] Austria .................................. 6174/77

[51] Int. Cl.³ .............................................. B05D 7/00
[52] U.S. Cl. ..................................... 427/216; 75/256; 427/242; 428/403; 428/471
[58] Field of Search ................. 75/1, 3, 44 R, 0.5 BA, 75/256; 148/6; 427/216, 220, 221, 336, 418, 419 A, 419 B, 242; 428/403, 404, 469, 471

[56] References Cited

U.S. PATENT DOCUMENTS

| 2,871,115 | 1/1959 | Agarwal | 75/44 R |
|---|---|---|---|
| 3,185,563 | 5/1965 | Jones et al. | 75/1 R |
| 3,690,930 | 9/1972 | Mueller et al. | 427/216 |
| 4,075,370 | 2/1978 | Burlingame et al. | 427/216 |
| 4,116,679 | 9/1978 | Pietsch | 75/3 |

Primary Examiner—L. Dewayne Rutledge
Assistant Examiner—Michael L. Lewis
Attorney, Agent, or Firm—Cushman, Darby & Cushman

[57] ABSTRACT

A process for treating sponge iron to protect it against reoxidation and/or corrosion during storage and transit comprising the steps of tumbling sponge iron which is in particle form with a pre-prepared blend of caustic lime powder and an adhesion promoting additive selected from the group consisting of iron oxide or mixtures thereof with iron to produce a coated product, the blend containing 1 to 20% by weight iron oxide; and then moistening the coated product with an amount of water less than the amount of water required for complete hydration of the caustic lime.

14 Claims, 2 Drawing Figures

PROCESS OF TREATING SPONGE IRON FOR PROTECTION AGAINST REOXIDATION AND APPARATUS FOR CARRYING OUT THE PROCESS

This invention relates to a process of treating sponge iron for protection against reoxidation and/or corrosion in storage and transit, and to apparatus for carrying out that process. Sponge iron is produced in that iron ores are directly reduced by means of a reducing gas, which consists in most cases of hydrogen and carbon monoxide and reduces the iron oxide to metallic iron. The material in process remains solid. The metallized end product has a high porosity and, for this reason, is highly susceptible to reoxidation. In this connection the term "reoxidation" includes an oxidation to form magnetite or hematite in the presence of oxygen ($3Fe + 2O_2 = Fe_3O_4$; $2Fe + 1\frac{1}{2}O_2 = Fe_2O_3$) as well as rusting in the presence of moisture and oxygen ($Fe + H_2O + \frac{1}{2} O_2 = Fe(OH)_2$).

The reoxidation of the metallized product means a high loss in quality because it decreases the degree of metallization $$( \frac{Fe_{met}}{Fe_{total}} ),$$

which is a measure of the quality of sponge iron. The iron oxide which has been formed by the reoxidation is either lost in the slag when the sponge iron is melted to produce steel or must be re-reduced, with a high expenditure of energy, which can be expected to amount to about 15 kWh per ton of sponge iron and percent decrease of degree of metallization.

It has already been proposed to provide sponge iron with organic or inorganic coatings to protecting the sponge iron against reoxidation or corrosion. All these known processes have the disadvantage that the materials of the protective coatings are disturbing in a subsequent steelmaking process and constitute foreign matter. E.g., more limestone must be added when silicate coatings are employed.

It is an object of the present invention to provide for the treatment of sponge iron a process which enables the sponge iron to be stored in the open and to be transported in open containers substantially without a risk of reoxidation by water or atmospheric humidity and which avoids the above-mentioned disadvantages during a subsequent steelmaking process. To accomplish that object, the invention essentially resides in that particles of sponge iron which has been produced are tumbled in a blend of caustic lime powder and adhesion-promoting additives, such as iron and its oxide, particularly $Fe_2O_3$ and $Fe_3O_4$, and are then moistened with a quantity of water which is smaller than the quantity of water required for a complete hydration of the caustic lime. When the sponge iron particles have been coated with caustic lime, the subsequent partial hydration of that caustic lime causes the coating on the sponge iron particles to swell. At the same time, the heat of hydration enables the formation of a protective magnetite layer on the surface of the sponge iron by any oxygen which has been able to diffuse through the coating. The presence of iron oxide powder in the coating improves the adhesion of the blend to the surface of the sponge iron. This process results in a considerable passivation of the sponge iron particles and in the decisive advantage that the protective layer surrounding the sponge iron particles is not disturbing during a subsequent steelmaking process but decreases the quantity of limestone whichis to be added in said process.

In a preferred embodiment of the invention, the uncoated sponge iron particles are applied to a sieve having sieve openings which have a width of at least 2 mm, preferably at least 4 mm, and those particles which have been retained on the sieve are subsequently coated with the blend of caustic lime powder and iron oxide powder. The particles can be uniformly coated in this way. Particles which are larger in diameter may be caused to agglomerate to form larger particles before being coated. That agglomeration may be effected, e.g. in a separate process step. Sponge iron particles which are larger than 8 mm in diameter are preferably coated with the blend of a caustic lime and iron oxide powder.

In the process according to the invention, the blend of caustic lime powder and iron oxide powder preferably contains at least 80% by weight of caustic lime powder and 1 to 20% by weight, preferably 10% by weight of iron oxide powder consisting of LD process dust. Sponge iron particles provided with such coating have exhibited a particularly high passivity under reoxidizing and corroding conditions.

In a preferred embodiment of the process according to the invention, the sponge iron particles are coated with the blend of caustic lime powder and iron oxide in pelletizing drums or on pelletizing plates and are moistened by being sprayed with a mist of water. For a satisfactory passivation of the surface of the sponge iron particles the blend of caustic lime powder and iron oxide powder must be applied to the sponge iron particles in a quantity of 3 to 6%, preferably 4 to 5% of the weight, of the sponge iron particles. The blend applied in such quantity will form a sufficiently thick coating, which ensures a reliable protection. The roughness and porosity of the surface of the sponge iron is of decisive influence on its ability to retain the coating material. When the sponge iron has a very smooth surface, e.g., because it has been abraded or is covered with carbon black, or when the sponge iron particles have pronounced corners, the process according to the invention may preferably be carried out in two coating drums used in succession and the coated particles discharged from the first coating drum may be sprayed with a controlled quantity of water which is smaller than the quantity of water which is added to the particles which have been discharged from the second coating drum and served to adjust the desired degree of hydration of the caustic lime in the coating. In that way the formation of a sufficiently thick protective coating will be ensured in every case.

The process according to the invention can be carried out in a particularly simple manner in that the weight of the blend of the caustic lime powder and iron oxide powder charged into the coating drum is approximately one-half of the weight of the sponge iron particles which are to be charged into the coating drum.

According to a preferred feature of the process according to the invention, water is added to the coated particles in the quantity which is required to hydrate 80% of the caustic lime of the coating. Those caustic lime particles which remain unhydrated in the coating on the sponge iron particles afford additional protection against an ingress of water because they can combine with diffused atmospheric humidity and rainwater. The coating on the sponge iron particles hardens in storage and thus improves the crushing strength and abrasion resistance of the sponge iron.

In the process according to the invention the coating and moistening of the particles may be effected at ambient temperature. Expensive temperature monitoring means such as are required in known processes are not needed in the process according to the invention.

The apparatus according to the invention for carrying out the process is characterized by a coating drum, a blender for blending caustic lime powder with iron oxide powder, particularly LD process dust, a proportioning feeder for charging sponge iron particles having a diameter at or above a predetermined lower limit into the coating drum, means for discharging the sponge iron particles which have been coated with the blend, a sieve for separating non-adhering blend of caustic lime powder and iron oxide powder, means for applying controlled quantities of water to the coated sponge iron particles, and means for removing those parts of the moist blend of caustic lime and iron oxide which do not adhere to the moistened sponge iron particles. According to a preferred feature of the invention, the apparatus may be provided with means by which the dry blend of caustic lime and iron oxide which has been separated from the sponge iron particles discharged from the coating drum is adapted to be transferred to the point where that blend is charged into the coating drum and-/or a second coating drum and that blend may be passed through means for weighing the blend before it is charged into the coating drum. When it is desired to coat smooth-surfaced sponge iron particles, the apparatus according to the invention may preferably comprise a second coating drum, which is succeeded by means for separating those parts of the dry blend consisting of caustic lime powder and iron oxide powder, which do not adhere to the particles which have been coated before, and by means of applying a controlled quantity of water.

Figure 2:
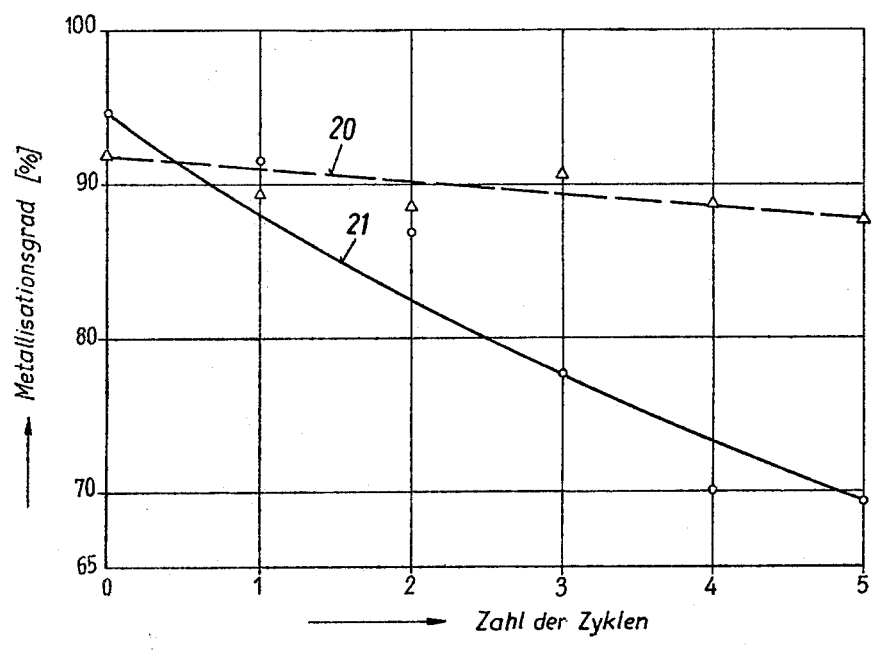

The invention will now be explained more fully with reference to the drawing, in which FIG. 1 is a diagrammatic view showing an apparatus for carrying out the process according to the invention and FIG. 2 is a time diagram showing the variation of the degree of metallization of a treated sponge iron sample and, for comparison, the variation of the degree of metallization of an untreated sponge iron specimen.

In FIG. 1, sponge iron particles discharged from the lower end of a direct-reduction plant are transferred by a belt conveyor 2 onto a sieve 3. The smaller sponge iron particles must be separated by a sieve immediately after the sponge iron has been produced because the fines tend to oxidize so intensely in contact with air that the fines begin to burn and because such fines would take up too much lime in a coating apparatus.

The sponge iron particles which have been retained on the sieve are charged into a coating drum 4. Caustic lime powder from a supply bin 5 and iron or oxide of iron from a supply bin 6 are fed to a blender 7. The blend 8 which is discharged from the blender is weighed by a weighing device 9 and is also charged to the coating drum 4. Coated sponge iron is discharged from the coating drum 4 and fed to a sieve 10, through which non-adhering dry blend consisting of lime, iron and iron oxide is removed. A proportioned quantity of water is supplied at 11 to the coated sponge iron particles. The quantity of water which has been supplied is measured by a water meter 12. The quantity of water to be added will depend on the thickness of the coating, i.e., on the weight of separated lime powder which is applied. The blend of time, iron, and iron oxide powder which has been passed through the sieve 10 is weighed once more by the weighing device 14 and may subsequently be charged to a second coating drum 13, as is shown in FIG. 1, or to the first coating drum 4 by means which are not shown. Just as the first coating drum 4, the second coating drum 13 is charged with a blend of lime and iron oxide powders after the blend has been weighed by the weighing device 15. The sponge iron which has been re-coated in the second coating drum 13 is discharged from the latter and applied to a sieve 16, which is passed through by non-adhering, surplus blend of lime and iron oxide powders. The removed blend is added to the blend which has passed through the sieve 10. The re-coated sponge iron then enters a second moistening station 17, in which water is added in the quantity which is required to effect a hydration to the desired degree. The quantity of water is measured by a suitable water meter 18.

At 11 and in the second moistening station 17, the sponge iron is moistened and is simultaneously separated on a sieve from non-adhering moist blend. As a result, only sponge iron particles having a surface formed by a satisfactorily adhering protective layer are fed to the second coating drum 13, or, by means of a conveyor 19, to a dump which is not shown.

The improvement regarding reoxidation and/or corrosion which is effected by the coating according to the invention is distinctly apparent from FIG. 2, in which an untreated sample and a treated sample of sponge iron particles are compared. In FIG. 2 the degree of metallization has been plotted on the axis of ordinates and the number of cycles to which the sample has been subjected in a corrosion tester has been plotted along the axis of the abscissas. In FIG. 2, curve 20 represents the variation of the degree of metallization of a sample which has been treated according to the invention and the curve 21 represents the variation of the degree of metallization of an untreated sample. For this purpose, untreated sponge iron and sponge iron treated with a blend of calcium oxide and iron oxide powders (9 parts sponge iron to one part of powder blend) were subjected in a corrosion tester (Kesternich tester) to a corrosion test according to a standardized procedure for five days. $SO_2$ and $CO_2$ gases were added to provide an aggressive atmosphere. The test run consisted of five cycles of 24 hours each. At the beginning of each cycle, two liters $SO_2$ and two liters $CO_2$ were fed into the enclosed vessel and a temperature of 55° C. was preset. After a heating-up time, a temperature of 55° C. and a humidity of 100% was reached. After eight hours the heating was discontinued and the tester was opened so that the atmosphere in the tester was gradually adjusted to the laboratory atmosphere. When the door had been opened, the sample 16 was left in the tester for 16 hours. After each cycle, samples were taken and analyzed for their metal content and total iron content. The degree of metallization plotted in the diagram is the ratio of metal content to total iron content $$(\frac{Fe_{met}}{Fe_{total}} \times 100).$$

It is apparent from FIG. 2 that under a simulated atmosphere which is very aggressive and moist, the treated samples exhibit only an insignificant oxidation compared to untreated samples of sponge iron of the same quality. The lower initial degree of metallization of the treated sample is due to the formation of the protective magnetite layer on the surface of sponge iron.

What we claim is:

1. A process for treating sponge iron to protect it against reoxidation and/or corrosion during storage and transit comprising the steps of
   tumbling sponge iron which is in particle form with a pre-prepared blend of caustic lime powder and an adhesion promoting additive selected from the group consisting of iron oxide or mixtures thereof with iron to produce a coated product, said blend containing 1 to 20% by weight iron oxide; and
   then moistening the coated product with an amount of water less than the amount of water required for complete hydration of the caustic lime.

2. The process of claim 1, wherein, prior to the step of tumbling, uncoated sponge iron particles are introduced into a sieve having sieve openings of a width of at least 2 mm, and then those uncoated sponge iron particles which are retained in the sieve are subjected to said step of tumbling.

3. The process of claim 2, wherein said width is at least 4 mm.

4. The process of claim 1, wherein sponge iron particles, which are subjected to said tumbling step, have a diameter greater 8 mm.

5. The process of claim 1, wherein said iron oxide is $Fe_2O_3$ or $Fe_2O_4$.

6. The process of claim 5, wherein the blend of lime powder and iron oxide contains at least 80% by weight of caustic lime.

7. The process of claim 5, wherein said iron oxide comprises at least 10% by weight of said blend.

8. The process of claim 1, wherein the coated product contains 3 to 6% by weight of said blend, based on the weight of sponge iron particles.

9. The process of claim 1, wherein said step of tumbling is undertaken in pelletizing drums or on pelletizing plates and wherein said step of moistening is undertaken by spraying a mist of water on said coated product.

10. The process of claim 1, wherein the weight of the blend used in said tumbling step is about one-half the weight of the sponge iron particles subjected to said tumbling step.

11. The process of claim 1, wherein the amount of water which is used in said moistening step is about 80% of that amount of water required to hydrate said caustic lime.

12. The process of claim 1, wherein each of said steps of tumbling and moistening are undertaken in two intermittent successive stages whereby the sponge iron particles are tumbled to form a coated product, moistened to form coated moistened sponge iron particles which are again tumbled in a blend of caustic lime powder and said adhesion promoting additive and then again moistened with an amount of water less than that used in the step of moistening said coated product.

13. The process of claim 1, 8 or 12, wherein said steps of tumbling and moistening are undertaken at ambient temperature.

14. The process of claim 1 or 8, wherein the tumbled moistened product exhibits substantial passivity to reoxidation and corrosion and wherein unhydrated lime present after said step of moistening can react with water and thus protect the sponge iron of the tumbled moistened product from atmospheric humidity and water.

* * * * *